Patented Apr. 25, 1944

2,347,320

UNITED STATES PATENT OFFICE 2,347,320

CASTING COMPOSITION

James R. Hiltner, Morrisville, Pa., assignor to Röhm & Haas Company, Philadelphia, Pa.

No Drawing. Application June 27, 1940, Serial No. 342,663

7 Claims. (Cl. 18—55)

This invention relates to a process for making cast objects of polymerized methyl methacrylate and similar polymeric materials. It also relates to a process for embedding objects within a mass of the polymeric materials.

It is known that cast sheets of polymeric materials may be made by polymerizing the monomer under carefully controlled conditions of temperature in narrow cells, the walls of which are able to move toward each other to compensate for the shrinkage which takes place during polymerization. It has also been proposed to make cast rods of these polymeric materials by placing the monomer in a vertical cylindrical mold, heating a narrow zone at the lower end and gradually moving the heating zone up the mold. Various objects have been embedded within masses of polymer by carefully polymerizing successive layers of monomer and thus building up a block surrounding the object. Thick sheets of polymeric methyl methacrylate have also been prepared by polymerizing successive superimposed layers. In all of these methods it is essential to control the temperature of polymerization for otherwise there is considerable bubble formation within the mass of polymer. Because of this, these methods cannot be used to produce sheets or blocks much over an inch thick within a period of time which would be commercially practical.

In United States Patent 2,120,006 it is shown that homogeneous plastic masses suitable for molding can be prepared by thoroughly mixing monomeric and polymeric methacrylic acid esters, the mixture being thoroughly masticated or allowed to stand for some time until a homogeneous, rubbery mass is formed. In the course of this mixing, the materials pass through several stages which may be distinguished by the consistency of the mixture. For example, when equal parts by weight of monomeric methyl methacrylate and a granular polymeric methyl methacrylate are first mixed, the polymer will settle rapidly on standing. If this mixture is stirred for a short time, the polymer swells somewhat and loses its tendency to settle. In this condition the mixture is still fluid enough to flow under the force of gravity. It is a non-homogeneous mixture of the swollen particles of polymer suspended in the monomer. If allowed to stand longer or if masticated, for example in a Banbury mixer, the monomer completely permeates the polymer and the entire mass is transformed into a homogeneous, more or less firm gel.

It has now been found that bubble-free castings of considerable thickness can be made by employing the mixture of monomer and polymer while it is still in the non-homogeneous stage just described, in other words, while it is still in a flowable state. This can be accomplished without the necessity of rigid temperature control by pouring the mixture into a mold and heating it under a fluid superatmospheric pressure which may be applied by means of a gas or of a liquid. By employing pressures of 50 to 175 lbs./sq. in. it is possible to complete the polymerization of the mixture at temperatures as high as 150° C. without danger of bubble formation. The higher temperatures permissible in this process make it possible to produce the castings in a very much shorter time than was possible by means of the older methods. The fluid pressure at these high polymerizing temperatures also serves to prevent the polymer from shrinking away from the mold in which it is being cast and, hence, permits the casting of polymers to the exact size and shape of the mold. The term "bubble-free castings of considerable thickness," as used herein, means castings which are recognized in the trade as being unusually thick, i. e., of a thickness of more than one-half inch.

Non-homogeneous mixtures which may be used as casting compositions are made generally by stirring the monomer and a granular polymer together only as long as is necessary to wet thoroughly the individual granules and bring about sufficient swelling so that the granules have little or no tendency to settle out. In this form the mixture may be poured into a mold.

The choice of monomer and polymer and various combinations of the two will depend on the particular results desired. In all cases the monomer selected should have the ability to swell the polymer, at least to some extent. When an optically homogeneous casting is desired, it is necessary to choose a monomer which on polymerization will yield a polymer of practically the same refractive index as that of the original polymer. The best combination for such purposes is, of course, to choose monomer and polymer of the same composition, either an individual compound or a mixture of two or more compounds which form a copolymer. Mottled effects can be obtained by choosing monomer and polymer of different refractive indices and also by choosing differently colored monomer and polymer. Preferably, the monomeric component is a lower aliphatic ester of methacrylic acid and the polymeric component a copolymer of a lower methacrylic ester and a lower acrylic ester. These preferred materials mix to the proper flowable stage within a reasonably short time, whereas some other materials, such as pure methacrylic ester monomers and polymers, require several hours' soaking or some additional treatment, such as slight heating. In general, polymeric materials having a relatively short chain length, such as those suitable for injection molding processes, mix more readily with monomeric materials than polymers having a long chain. Representative of the materials that may be used in the process are methyl methacrylate, ethyl methacrylate, vinyl acetate and styrene, monomers or polymers, and copolymers of these materials with each other or with acrylic and methacrylic esters. Copolymers of methyl or ethyl methacrylate with styrene or methyl or ethyl acrylate are particularly suited as the polymeric component, and methyl or ethyl methacrylate monomer as the monomeric component. The polymeric component of the mixture should amount to at least 30% of the total and it is desirable to use as much more as can be conveniently mixed with the monomer. Usually 65–68% polymer can be used without difficulty. The practical upper limit is about 75% polymer.

After the mixture of monomer and polymer is poured into the mold, it may either be polymerized immediately or allowed to set to a homogeneous rubbery consistency prior to polymerization.

The fluid pressure that is applied may be maintained either by a gas or liquid. In case a gas is used, one should be chosen which is not very soluble in the monomer as this might give rise to fractures when the pressure is released. Liquids which have no solvent action or chemical action on the monomer or polymer should be chosen. Water is suitable but it usually causes translucency where it comes in direct contact with the casting material. The pressure employed may range from 50 to 175 lbs./sq. in. In all cases, however, it should be greater than the vapor pressure of the monomer at the temperature employed so as to avoid ebullition and consequent formation of bubbles within the casting and should be maintained after polymerization until the casting has cooled. The temperature may be from about 75 to 150° C. and will depend to some extent on the thickness of the casting. For thick castings lower temperatures and longer times will be required to complete the polymerization of the monomer.

The molds suitable for making the castings may be made of metal, plaster of Paris, wood, glass, etc. Plaster molds are suitable for making casts of sculptures in relief, either high or low, particularly in such figures in which there is considerable undercutting. After the polymerization of the casting material is completed, the mold can be broken away. Plaster molds should be lined prior to filling, for example with a solution of water-glass which, after drying, can be coated with cellulose acetate. This adheres to the finished casting but is easily rubbed or brushed off. Wooden molds may be lined with Cellophane which, however, is not cemented to the walls. The Cellophane adheres to the finished casting and can be readily removed.

The following examples will illustrate the invention:

*Example 1.*—65 parts of a granular copolymer, prepared by the emulsion polymerization process from a mixture of 100 parts of methyl methacrylate and 15 parts of ethyl acrylate, is mixed with 35 parts of monomeric methyl methacrylate containing 0.1% of benzoyl peroxide. This mixture is stirred for several minutes to insure complete wetting of each particle of polymer and to permit the particles to swell sufficiently to prevent settling. A mold is prepared by erecting a low frame of wood or other suitable material around the edges of a sheet of glass. The above mixture is then poured out on the glass and, after it is evenly distributed, a second glass plate is placed on top of the material, taking care that no air pockets are formed between the glass and the casting material. The sandwich thus formed is allowed to stand at ordinary temperature for a few minutes until the mixture of polymer and monomer sets to a fairly stiff gel. The frame is removed and the sandwich placed in an autoclave. Nitrogen is then admitted to the autoclave until the pressure reaches about 75 lbs./sq. in. whereupon the temperature is raised to about 120° C. and maintained for one to two hours. After the polymerization is complete, the product is cooled in the autoclave while the pressure is maintained, which requires about two hours. When the sandwich is cooled to about room temperature, the glass and the finished polymer separate easily. The casting thus obtained is in the form of a flat sheet with highly polished surfaces. By this method it is possible to make sheets of polymer several times as thick as those which can be made by polymerizing monomer or a prepolymerized syrup in a glass-walled cell.

*Example 2.*—A mold is made of wood about 18" long, 6" deep and 6" wide and lined with Cellophane. The Cellophane is not cemented to the walls of the mold but is so arranged that the casting material cannot come in contact with the wood. This mold is then filled with the casting mixture described in Example 1, the open side covered with a sheet of Cellophane and placed in an autoclave. It is then heated at about 120° for about three hours under a nitrogen pressure of about 150 lbs./sq. in. The casting is allowed to cool in the autoclave under pressure for about ten hours, after which it may be removed. The casting has shrunk away from the walls of the mold and the Cellophane adheres to the casting. This can be easily peeled off. The final casting is entirely free of bubbles.

*Example 3.*—60 parts of a copolymer made from 100 parts of methyl methacrylate and 25 parts of ethyl acrylate is mixed as described in Example 1 with 40 parts of a mixture of the same monomers in the same proportion and 0.1% of benzoyl peroxide added. A plaster mold of a sculpture is made, coated with water-glass and, after this has dried, a coating of cellulose acetate is applied. The above mixture of monomer and polymer is then poured into this mold and the open side covered with a sheet of Cellophane. The mold is placed in an autoclave and heated at about 120° C. under 100 lbs./sq. in. nitrogen pressure for three hours after which it is cooled to room temperature, the pressure being maintained during cooling. On removal from the autoclave, the mold is broken away and any cellulose acetate adhering to the coating peeled off. A perfectly clear casting is thus obtained.

The same general procedure can be used for embedding objects in blocks of polymer. Usually the object to be embedded is placed on a small sheet of polymer or gelled monomer-polymer mixture in the bottom of the mold and the casting mixture poured over it. The object to be embedded must be free of moisture and insoluble in the monomer employed. Photographs, identification cards, metal, wood, pine cones, and a small painted model of a sailing vessel have been successfully embedded in polymethyl methacrylate by this method.

I claim:

1. A process for the preparation of bubble-free cast objects of methyl methacrylate polymer of considerable thickness which comprises mixing from 30 to 70 parts of granular polymeric methyl methacrylate with from 70 to 30 parts of monomeric methyl methacrylate, pouring the said mixture prior to its setting to a gel into a mold, heating the same under a fluid pressure of from 50 to 75 lbs. per square inch to a temperature of from 75 to 150° C. until the monomeric methyl methacrylate is polymerized, and cooling the polymeric material while maintaining the fluid pressure.

2. A process for the preparation of bubble-free cast objects of polymeric materials of considerable thickness which comprises mixing from 30 to 70 parts of a granular copolymer of a lower aliphatic ester of methacrylate acid and a lower aliphatic ester of acrylic acid with 70 to 30 parts of the monomeric lower aliphatic ester of methacrylic acid to form a non-homogeneous, flowable mixture, pouring said mixture prior to its setting to a gel into a mold, heating the mixture under a fluid pressure of from 50 to 175 pounds per square inch to a temperature of from 75 to 150° C. until the monomeric methacrylic ester is polymerized, and cooling the polymeric material while maintaining the fluid pressure.

3. A process for the preparation of thick, bubble-free cast sheets of polymeric material which comprises mixing from 30 to 70 parts of a granular copolymer of a lower aliphatic ester of methacrylic acid and a lower aliphatic ester of acrylic acid and from 70 to 30 parts of a monomeric lower aliphatic ester of methacrylic acid to form a non-homogeneous flowable mixture, flowing said mixture onto a glass sheet having a raised frame extending around its edges, placing a second glass sheet upon the mixture, allowing the assembly to stand until the mixture sets to a gel, heating the mixture between the glass sheets under a fluid pressure of from 50 to 175 pounds per square inch to a temperature of from 75 to 150° C. to polymerize the monomeric material, and removing the glass sheets from the polymerized material.

4. A process for embedding objects in cast polymeric material which comprises mixing a granular copolymer of a lower aliphatic ester of methacrylic acid and a lower aliphatic ester of acrylic acid with a monomeric lower aliphatic ester of methacrylic acid to form a non-homogeneous flowable mixture, supporting an object to be embedded within a mold, pouring said mixture into the mold, heating the mixture under a fluid pressure of from 50 to 175 pounds per square inch at a temperature of from 75 to 150° C. until the monomeric material in said mixture is polymerized, and cooling the polymeric material while maintaining the fluid pressure.

5. A process for the preparation of bubble-free cast objects of polymeric materials of considerable thickness which comprises mixing from 30 to 70 parts of a granular polymeric material selected from the group consisting of the methyl and ethyl esters of acrylic and methacrylic acids, vinyl acetate, styrene and copolymers of the same with from 70 to 30 parts of a monomeric polymerizable material selected from the same group, pouring said mixture, prior to its setting to a gel, into a mold, heating said mold and its entire contents under a fluid pressure of about 50 to 175 pounds per square inch to an elevated polymerizing temperature between about 75° C. and 150° C., maintaining said elevated temperature until the contents of the mold are polymerized, cooling the polymerized material while maintaining said fluid pressure, and thereafter removing the cooled polymerized cast object from the mold.

6. A process for the preparation of bubble-free cast objects of polymeric materials of considerable thickness which comprises mixing from 30 to 70 parts of a granular copolymer of an ester from the group consisting of methyl and ethyl methacrylates and an ester from the group consisting of methyl and ethyl acrylates with 70 to 30 parts of a monomeric ester from the group consisting of methyl and ethyl methacrylates and acrylates, pouring said mixture, prior to its setting to a gel, into a mold, heating the mold and contents, under a pressure of about 50 to 175 pounds per square inch, to an elevated temperature between 75° C. and 150° C., maintaining said elevated temperature until the monomeric material is polymerized, cooling the polymeric material while maintaining said fluid pressure, and thereafter removing the cast object from the mold.

7. A process for the preparation of bubble-free cast sheets of polymeric material of considerable thickness which comprises mixing from 30 to 70 parts of a granular polymeric material selected from the group consisting of the methyl and ethyl esters of acrylic and methacrylic acids, vinyl acetate, styrene, and copolymers of the same with from 70 to 30 parts of a monomeric polymerizable material selected from the same group, pouring said mixture onto a glass sheet having a raised frame extending around its edges, placing a second glass sheet upon the mixture, allowing the assembly thus prepared to stand until the mixture sets to a gel, heating the mixture between glass sheets under a fluid pressure of from 50 to 175 pounds per square inch to a temperature of from 75° C. to 150° C. to polymerize the monomeric material, and thereafter removing the glass sheets from the polymerized material.

JAMES R. HILTNER.